Dec. 23, 1958  A. CARLI  2,865,733
SMELTING PROCESS
Filed Feb. 27, 1953
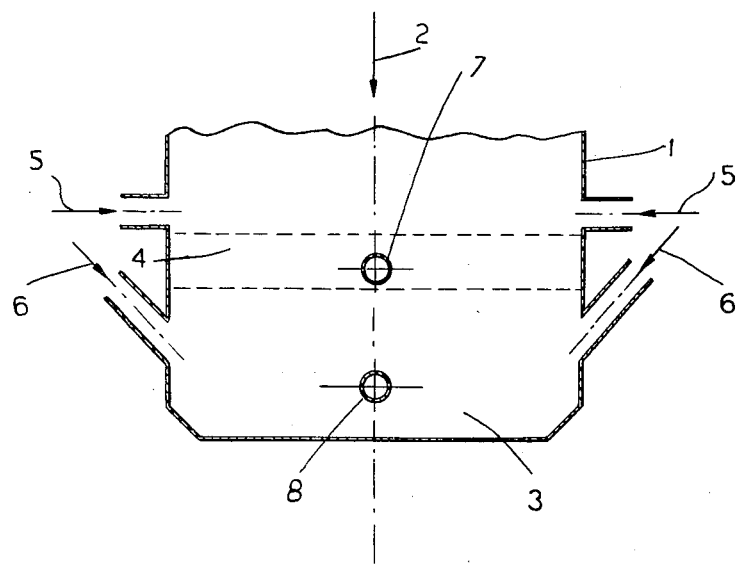
Inventor
Adriano Carli United States Patent Office 2,865,733
Patented Dec. 23, 1958

2,865,733

SMELTING PROCESS

Adriano Carli, Genoa, Italy, assignor to Societa Finanziaria Siderurgica Finsider S. p. A., Genoa, Italy Application February 27, 1953, Serial No. 339,337

Claims priority, application Italy April 30, 1952

11 Claims. (Cl. 75—40)

The present invention relates to the primary metallurgy and siderurgy and more particularly to the igneous treatment of metallic ores and especially of ferrous ores, with a view to their reduction to metal.

In the known igneous reduction processes of metallic ores and ferrous ores in particular, until now recourse has been made to the use of solid fuels (coal). Such solid fuels, through their partial combustion, the high temperature necessary for heating and melting the charge, and also produce the reducing gases (carbon monoxide) necessary for the simultaneous reduction of the ores.

Combustion must, therefore, be regulated to provide for the fundamental aim of ore reduction, and binding the reduction process to the employment of determined fuel qualities, which does not often allow for a convenient and complete attention to combustion problems per se.

In the ore reduction processes, recourse was made to the use of other fuels, more particularly of fluid fuels, in consideration of their lower cost as well as their greater availability. However, fluid fuels were not able to reproduce the chemical effects above envisaged for coal.

This double problem, i. e. of the complete exploitation of the fuel for its heat content and of the possibility of employing all types of fuels for metallic ore reduction processes, is solved, according to the present invention, by completely separating in the processes the heating and melting phase of the charge that is carried out irrespectively of the ore reduction. Thus any means are employed which are apt to supply the heat required supply, and provision is made for the chemical reduction phase separately, by means of a direct introduction, into the molten metal mass, of carbonaceous substances.

This separate introduction of the carbonaceous substances subjects them to the influence of the combustion zone atmosphere. This atmosphere may be an oxidizing one if desired. This permits use of any type of fuel for supplying the thermic energy required for the melting and for the regular development of the chemical reactions. In view of the very high heat concentration required for making the process a quick and low cost one, the employment of fluid fuels, such as natural gas, fuel oil and the like are particularly suitable.

As an aid to combustion, air or more advantageously oxygen may be utilized, providing that, when necessary, they are heated along with the natural gases. For preheating purposes exhaust gases may be used where circumstances make it advisable. In any case, it will be convenient to maintain in the combustion zone an excess of oxygen in order to be able to burn the carbon monoxide developed by the reduction, which will thus substantially contribute to the supply of heat. The gases discharged at the outlet of the furnace will consequently be chemically exhausted and at low temperature. The exhaust gases can be discharged into the atmosphere, unless it is preferred, to let them discharge at high temperature (800–900° C.) and to recuperate their heat for pre-heating, as indicated above.

Melting of the mineral in an oxidizing atmosphere, besides allowing for a much greater heat concentration, eliminates sulphur, arsenic and other detrimental impurities from the minerals, eventually making possible the direct treatment of sulphides (pyrites) with recovery of the sulphur from the exhaust gases.

The introduction of the carbonaceous substances into the metal bath will take place in a direct way and under pressure. Care must be taken to avoid, or to limit, the cooling of the metal in order not to slow down the solution rate of the carbon in the iron. If necessary, means may be arranged for heating such substances before their introduction into the bath.

The figure very summarily indicates the coordination of the various phases of the process in a furnace of the closed crucible type, such as is convenient for the carrying out of the process.

In said figure, limited to the lower part of the furnace, 1 indicates the retaining walls of the furnace. The charge of material is dumped into the furnace in the direction of arrow 2 toward the crucible collecting the metal 3, and that portion collecting the slag 4, each being provided with respective discharge holes 7 and 8. The charge is heated at its base by the combustible mixture injected into the interior of the crucible according to arrows 5, while the carbonaceous substances are driven into the bath 3 as indicated by arrows 6.

If reference is made, for instance, to the production of cast iron, it can be estimated that the heat required (for natural gas) is about 1 to 1.2 million metric calories per ton of cast iron (corresponding to the energy consumption in electric furnaces minus the heat of the reaction gases), and the necessary quantity of air is about 2000 to 2500 cu. m. per ton. The quantity of gas formed will then be little different from that formed in blast furnace shafts. The charge; constituted by ore and the eventual flux, will then be preheated uniformly. It is however to be borne in mind that, in general, furnaces having smaller proportions may be used. Generally, for the same charge and crucible capacity, the iron content is about three times as great as the blast furnace capacity and therefore, the production can be three times as great. A very great concentration of thermic energy is necessary in such cases, but differently from the blast and the electric furnaces, such energy is practically unlimited, especially if oxygen is used as a combustion aid and the fluid fuel is pre-heated and/or used under relatively high pressures. It is thus possible to attain combustion speeds and heat concentrations, per unit of volume and time, in the order of 10 to 15 times those possible in the ordinary furnaces. Therefore, the power required ore cannot only be assured, but a considerable excess remains available. This power can be utilized, for instance, by incorporating with the combustible mixture, powdered ore or chalk or other substances. This is not possible in the blast furnace where the thermic energy is but sufficient to maintain the running balance.

The production per hour will essentially be determined by the speed of solution of the carbon in the iron and the speed of the reduction reaction; such speeds can, however, be considered as higher than those of ordinary furnaces on account of the higher temperature in the combustion zone as well as of the super-heating possibilities of the carbon introduced. There being, besides, a greater extension of the contact surfaces on account of the greater depth and volume of the crucible (contact between iron and carbon), and a more complete utilization of the bath-slag contact surface (there is no center coke column). Thus a reaction activity remarkably greater than that of ordinary furnaces will be attained.

Actually, then, the proposed process attains in its application to siderurgy the following advantages over other known processes:

It permits the production of cast iron without having to resort to coke coal, utilizing instead a fluid fuel such as natural gas or fuel oil and as a reducing agent any carbon or carbonaceous mixture, even a pulverulent or pasty one, provided it is sufficiently rich in carbon;

The reduction gas is entirely utilized and consequently the necessary quantity of fuel is reduced and the plant is simplified;

Ore impure from sulphur, arsenic or other materials reducible only with difficulty can be directly employed;

It permits a greater liberty in the choice of the slag composition and in the running conditions in consequence of the higher temperature and of the available power margin;

Cast iron production per cu. m. of furnace is higher and plant costs are lower;

It gives a possibility of rational employment of oxygen instead of, or in adjunction to, air with further developments of productivity and running elasticity and of employing poor fuels;

It makes possible the direct introduction into the lower part of the furnace, pulverulent ores or fluxes with a considerable economy in the preparation and agglomeration expenses;

It makes possible the direct introduction into the metal bath (together with, or also separately from, the carbonaceous substance) alloying, and/or correcting and refining materials, of the components of the molten metal.

What I claim is:

1. A process for manufacturing metals from metal ores, comprising the steps of subjecting a metal ore to a first continuous fuel supply so as to heat and smelt said metal ore, and subjecting said heated and smelted metal ore to a second continuous fuel supply so as to reduce the same to a molten metal, said first and second fuel supplies being independent of each other and separately regulatable so as to allow separate regulations thereof being adapted, respectively, to the exact fuel demands of said heaitng and smelting step and said reducing step.

2. A process as claimed in claim 1, said reducing step being carried out in the liquid phase by a direct introduction of a carbonaceous material into said molten metal being present in the lower stage of a thermal process, said heating and melting step being carried out in an upper stage of said thermal process.

3. A process as claimed in claim 2, and the step of introducing directly a finely divided additive material into said lower stage.

4. A process for manufacturing metals from metal ores, comprising the steps of subjecting a metal ore to a first continuous fuel supply so as to heat and smelt said metal ore, subjecting said heated and smelted metal ore to a second continuous fuel supply so as to reduce the same to a molten metal, said first and second fuel supplies being independent of each other and separately regulatable so as to allow separate regulations thereof being adapted, respectively, to the exact fuel demands of said heating and smelting step and said reducing step, and introducing an alloying material directly into the molten metal together with said second fuel supply.

5. A process for manufacturing metals from metal ores, comprising the steps of subjecting a metal ore to a first continuous fuel supply so as to heat and smelt said metal ore, subjecting said heated and smelted metal ore to a second continuous fuel supply so as to reduce the same to a molten metal, said first and second fuel supplies being independent of each other and separately regulatable so as to allow separate regulations thereof being adapted, respectively, to the exact fuel demands of said heating and smelting step and said reducing step, and introducing a material correcting the components of said molten metal directly into the molten metal together with said second fuel supply.

6. A process for manufacturing metals from metal ores, comprising the steps of subjecting a metal ore to a first continuous supply of a liquid fuel so as to heat and smelt said metal ore, and subjecting said heated and smelted metal ore to a second continuous fuel supply so as to reduce the same to a molten metal, said first and second fuel supplies being independent of each other and separately regulatable so as to allow separate regulations thereof being adapted, respectively, to the exact fuel demands of said heating and smelting step and said reducing step.

7. A process for manufacturing metals from metal ores, comprising the steps of subjecting a metal ore to a first continuous fuel supply so as to heat and smelt said metal ore, and subjecting said heated and smelted metal ore to a second continuous fuel supply so as to reduce the same to a molten metal, said first and second fuel supplies being independent of each other and separately regulatable so as to allow separate regulations thereof being adapted, respectively, to the exact fuel demands of said heating and smelting step and said reducing step, said first fuel supply containing gaseous oxygen as an oxidizing agent.

8. A process for manufacturing metals from metal ores, comprising the steps of subjecting a metal ore to a first continuous fuel supply so as to heat and smelt said metal ore, and subjecting said heated and smelted metal ore to a second continuous fuel supply so as to reduce the same to a molten metal, said first and second fuel supplies being independent of each other and separately regulatable so as to allow separate regulations thereof being adapted, respectively, to the exact fuel demands of said heating and smelting step and said reducing step, said fuel supplies being preheated.

9. A process as claimed in claim 8, said preheating being performed by exhaust gases.

10. The improved method for the continuous production of iron from an iron ore, comprising introducing said iron ore into an upper vertically-extending melting zone, continuously introducing a fluid heating medium into the lower part of said upper zone and upwardly through said zone to effect the melting of said ore in the absence of any substantial reduction thereof, continuously flowing said molten ore from said upper zone to a lower zone communicating with the bottom of said upper zone, and introducing a reducing carbonaceous second medium into said second zone at a point at least adjacent to the lower surface of said molten ore to effect the reduction thereof to iron.

11. The improved method in accordance with claim 10 wherein said heating medium contains an excess of oxygen, and carbon monoxide is evolved during said reduction step, said carbon monoxide passing upwardly through said upper zone and combining with said excess oxygen to effect the combustion thereof.

References Cited in the file of this patent

UNITED STATES PATENTS

| | | |
|---|---|---|
| 299,637 | Griffin | June 3, 1884 |
| 350,574 | Wainwright | Oct. 12, 1886 |
| 502,482 | Dauber | Aug. 1, 1893 |
| 719,320 | Foster | Jan. 27, 1903 |
| 828,583 | Thiel | Aug. 14, 1906 |
| 859,572 | McDonald | July 9, 1907 |
| 910,707 | Morgan | Jan. 26, 1909 |
| 1,578,009 | Burgers | Mar. 23, 1926 |
| 1,744,213 | Davis | Jan. 21, 1930 |
| 2,133,571 | Rochling et al. | Oct. 18, 1938 |
| 2,333,417 | Duffield | Nov. 2, 1943 |

OTHER REFERENCES

Sisco: "The Constitution of Steel and Cast Iron" (1930), page 48.

"The Making, Shaping and Treating of Steel" (6th ed.), pages 197, 596, 597, 599.